United States Patent [19]
Adam

[11] 3,921,947
[45] Nov. 25, 1975

[54] ADJUSTABLE TRIPOD

[76] Inventor: Alistair Peter Adam, 1159 N. Shore Blvd., Apt. 36, Burlington, Ontario, Canada

[22] Filed: Sept. 24, 1974

[21] Appl. No.: 508,781

[52] U.S. Cl. ............................... 248/169; 248/168
[51] Int. Cl.$^2$ ....................................... F16M 11/38
[58] Field of Search ....... 248/46, 47, 168, 169, 170, 248/171, 187.7, 155.2, 155.3; 168/128

[56] References Cited
UNITED STATES PATENTS

| | | | |
|---|---|---|---|
| 523,376 | 7/1894 | Pruckner | 248/47 |
| 2,630,289 | 3/1953 | Selig | 248/169 |
| 2,633,319 | 3/1953 | Musial | 248/168 |

FOREIGN PATENTS OR APPLICATIONS

| | | | |
|---|---|---|---|
| 503,098 | 3/1939 | United Kingdom | 248/171 |

*Primary Examiner*—Willaim H. Schultz
*Attorney, Agent, or Firm*—Hirons & Rogers

[57] ABSTRACT

In a photographic tripod comprising a body member and at least three legs pivoted thereto, each leg has a cam member which co-operates with a centrally-disposed, vertically-movable common cam mounted above the body member to determine the maximum straddle of the legs and thus the height of the tripod, the weight of the tripod and a device supported thereby urging the leg cam members into engagement with the common cam member. The common cam member is mounted on a vertically-movable post which can be clamped at any position between two limit positions.

5 Claims, 4 Drawing Figures

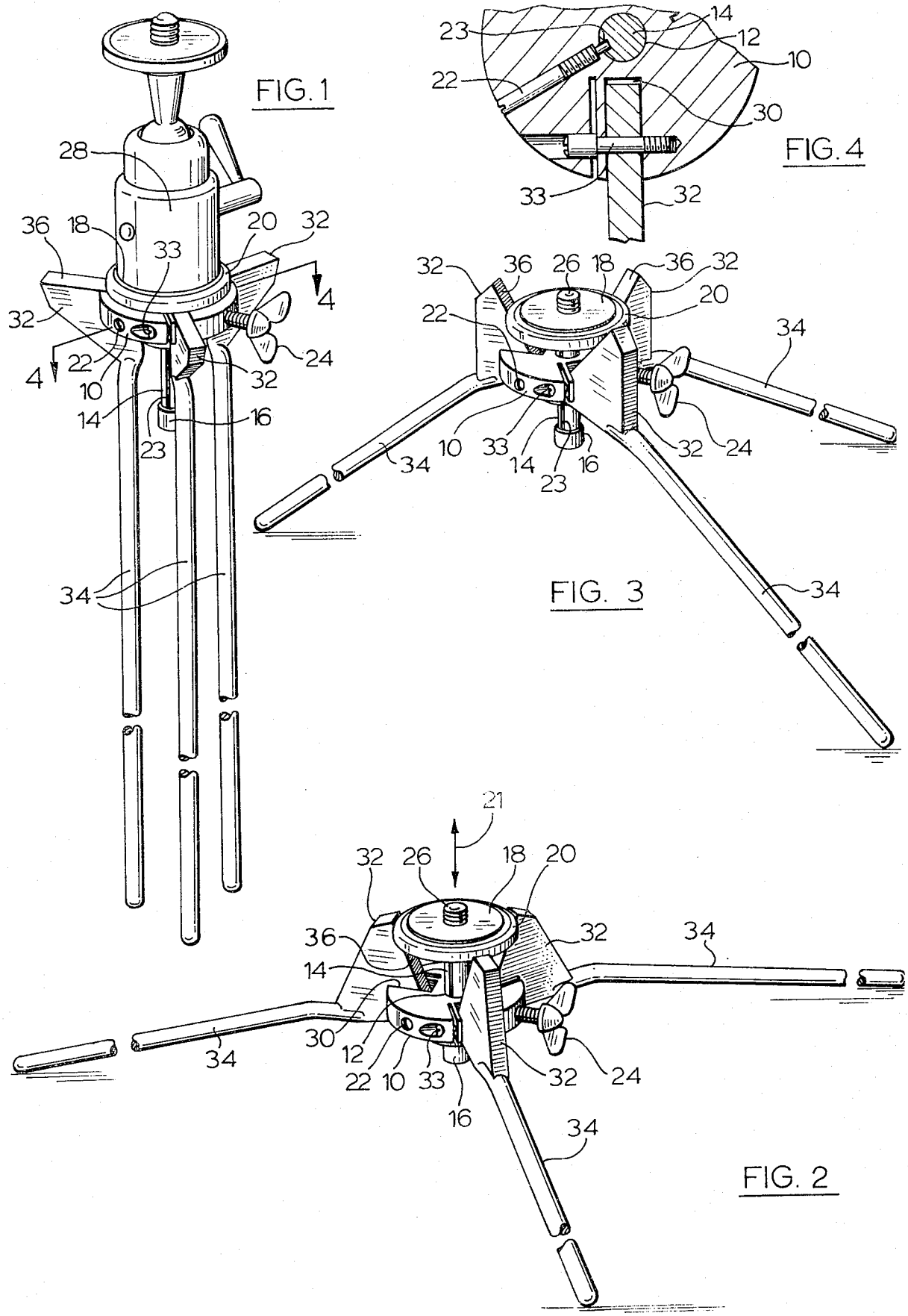

ADJUSTABLE TRIPOD

FIELD OF THE INVENTION

The present invention is concerned with improvements in or relating to tripods, such as are used for the support of cameras, instruments, stands and like apparatus.

REVIEW OF THE PRIOR ART

Tripods are commonly used for supporting various kinds of apparatus, particularly cameras and instruments, which are required to be supported firmly and securely at different elevations. One solution to this problem has been to provide the tripod with telescopic legs which can be pulled out to different extents, but such an arrangement permits only a limited number of different elevations corresponding to the number of leg sections. In another solution proposed in U.S. Pat. No. 3,480,250, issued 25 Nov., 1969, the tripod stand has an adjustable leg span by engaging the legs in different slots of different radial depths in a central ring; such an arrangement also provides only a limited number of possible elevations corresponding to the number of slots. U.S Patent No. 2,633,319, issued 31 Mar. 1953, discloses another construction wherein a cam block mounted below the tripod body to which the legs are pivoted has sets of recesses in which the legs can be engaged, the sets being of different depths to determine the minimum straddle of the legs.

OBJECTS OF THE INVENTION

It is an object of the invention to provide a new tripod construction having an adjustable leg span.

It is a more specific object to provide such a tripod with a substantially continuously adjustable leg span.

In accordance with the present invention thee is provided a tripod with an adjustable leg span comprising a body member, at least three legs pivoted to the body member about respective horizontal pivots, a common cam member having a cam face and mounted by the body member for movement above the body member along an axis that in operation of the tripod is at least substantially vertical, means for locking the cam member at any selected position along the said axis about the body member between two limit positions, and a leg cam member on each leg having a respective leg cam face extendable above the body member and engageable with the said common cam face to position the associated leg about the respective pivot axis and determine the maximum straddle of the legs, whereby the weight of the tripod and a device supported thereby will urge the leg cam faces into operative engagement with the common cam face.

DESCRIPTION OF THE DRAWINGS

A tripod which is a particular preferred embodiment of the invention will now be described, by way of example, with reference to the accompanying diagrammatic drawings wherein:

FIG. 1 is a side elevation showing the tripod with the legs thereof in the fully closed position, FIGS. 2 and 3 are similar views showing the legs respectively in the fully straddled and intermediate positions, and FIG. 4 is a partial cross-section on the line 4—4 of FIG. 1.

DESCRIPTION OF THE PREFERRED EMBODIMENTS

In this embodiment tripod body member 10 has the form of a circular disc with a central hole 12, through which passes a post member 14 having an enlarged lower end 16 constituting a stop member. A common cam member 18 is attached to the other end of the post and also has the form of a circular disc, providing a corresponding cylindrical cam face 20. The post is movable longitudinally through the hole 12 in the direction of the arrows 21 and is prevented from rotating in the hole by the engagement of the inner end of a radially-extending pin 22 in a vertical groove 23 in the post. The post can be locked by means of a locking screw 24 in any position between the two extreme positions determined by the engagement of the disc 18 and stop member 16 with the top face of the body member 10. A screw-threaded part 26 extending from the top of the disc 18 receives a conventional adjustable photographic head 28, as shown in FIG. 1.

The disc 10 is provided with three equally circumferentially-spaced radially-extending slots 30, in each of which a cam member 32 is mounted for pivoting movement about a pivot pin 33 that in operation is disposed with the pivot axis horizontal. A leg member 34 is fixed to each cam member for movement therewith about the respective pivot pin. Each cam member has a corresponding cam face 36 facing toward an axis passing through the centres of the body 10 and the common cam member 18 and coaxial with the axis of the post 14 and engageable with the cam face 20. The shape of the cam faces 36 is such that, as the cam member 18 moves progressively further away from the body 10, the leg members can straddle further and further apart, as illustrated by the progression from FIG. 1 to FIG. 2 through FIG. 3. Cam shapes other than that specifically illustrated can of course be used.

It will be seen that substantially infinite control is provided between the two limit positions for the angle or extent of straddle of the leg members, while the weight of the device mounted on the common cam member 18 presses the cam members 32 into contact with the member 18, so that the tripod will stay firm and steady in its set position. Moreover, since the legs can swing freely to move the cam members apart, the tripod legs can at any time be swung to a stored position approximately parallel to one another, as illustrated by FIG. 1, without disturbing the setting of the common cam member 18 or the locking screw 24, and the tripod can later be returned exactly to its preset position.

In other embodiments the legs can be pivoted directly to the body member, while the cam members are fixed to the respective legs but do not function to pivotally connect the legs to the body member.

I claim:

1. A tripod with an adjustable leg span comprising a body member, at least three legs pivoted to the body member about respective horizontal pivots, a common cam member having a cam face and mounted by the body member for movement above the body member along an axis that in operation of the tripod is at least substantially vertical, means for locking the cam member at any selected position along the said axis above the body member between two limit positions, and a leg cam member on each leg having a respective leg cam face extendable above the body member and engageable with the said common cam face to position the associated leg about the respective pivot axis and determine the maximum straddle of the legs, whereby the weight of the tripod and a device supported thereby will urge the leg cam faces into operative engagement with the common cam face.

2. The invention as claimed in claim 1, wherein the said common cam member mounted above the body member is constituted by a circular disc having its centre on the said axis.

3. The invention as claimed in claim 2, wherein means mounting the disc common cam member comprise a shaft to which the disc is attached mounted in a corresponding bore in the body member for movement along the said axis, and the means for locking the cam member at any selected position comprise a locking screw in the body member engaging the shaft.

4. The invention as claimed in claim 1, wherein each leg cam member comprises means mounting the respective leg to the body member, each leg cam member being pivoted to the body member and each leg being fixed to the respective leg cam member.

5. The invention as claimed in claim 2, wherein the disc common cam member also constitutes means for mounting a device on the tripod.

* * * * *